United States Patent
Huang et al.

(10) Patent No.: US 7,933,196 B2
(45) Date of Patent: Apr. 26, 2011

(54) METHOD AND APPARATUS FOR CANCELING CHANNEL INTERFERENCE

(75) Inventors: Liang-Wei Huang, Taipei (TW);
Chih-Yung Shih, Taipei (TW);
Shieh-Hsing Kuo, Taipei County (TW)

(73) Assignee: Realtek Semiconductor Corp., Hsinchu (TW)

( * ) Notice: Subject to any disclaimer, the term of this patent is extended or adjusted under 35 U.S.C. 154(b) by 85 days.

(21) Appl. No.: 12/250,528

(22) Filed: Oct. 13, 2008

(65) Prior Publication Data

US 2009/0097394 A1    Apr. 16, 2009

(30) Foreign Application Priority Data

Oct. 16, 2007   (TW) ............................... 96138675 A

(51) Int. Cl.
*H04J 3/10*    (2006.01)
(52) U.S. Cl. ........ 370/210; 370/286; 370/290; 370/292; 370/282
(58) Field of Classification Search .................. 370/201, 370/352, 291, 286, 210, 290, 292, 282
See application file for complete search history.

(56) References Cited

U.S. PATENT DOCUMENTS

| | | | |
|---|---|---|---|
| 6,459,746 B2* | 10/2002 | Agazzi et al. | 375/371 |
| 7,002,297 B2* | 2/2006 | Aoki et al. | 313/584 |
| 7,002,897 B2 | 2/2006 | Jones et al. | |
| 7,227,883 B2 | 6/2007 | Tellado et al. | |
| 7,352,687 B2* | 4/2008 | Jones et al. | 370/201 |
| 7,471,670 B1* | 12/2008 | Chen et al. | 370/352 |
| 2001/0036160 A1* | 11/2001 | Curran et al. | 370/290 |
| 2002/0191552 A1* | 12/2002 | Watkinson | 370/286 |

FOREIGN PATENT DOCUMENTS

WO    WO 9717767    *   5/1997

* cited by examiner

*Primary Examiner* — Ricky Ngo
*Assistant Examiner* — Dewanda Samuel
(74) *Attorney, Agent, or Firm* — Thomas, Kayden, Horstemeyer & Risley, LLP

(57) ABSTRACT

An apparatus for channel interference cancellation includes a first interference-cancellation module and a first cancellation-signal generating circuit. The first interference-cancellation module comprises a first processing circuit including a grouping circuit and a first transforming circuit. The grouping circuit divides received data into a plurality of groups of first sub-data. The first transforming circuit sequentially transforms the groups of first sub-data from a first domain to a second domain to generate a plurality of groups of first transformed sub-data. The first cancellation-signal generating circuit comprises a delay unit, a first processing unit and a second processing unit. The delay unit sequentially delays the groups of first transformed sub-data to generate a plurality of groups of delayed sub-data. The first and the second processing unit output a first and a second processed signal according to the groups of first transformed sub-data and the groups of delayed sub-data respectively.

30 Claims, 4 Drawing Sheets

METHOD AND APPARATUS FOR CANCELING CHANNEL INTERFERENCE

BACKGROUND OF THE INVENTION

1. Field of the Invention

The present invention relates to a communication system, and more particularly, to a communication system for canceling channel interference and a method thereof.

2. Description of the Prior Art

A full duplex Ethernet communication is accomplished by four unshielded twisted pairs, as shown in FIG. 1. In FIG. 1, signal interference existing in the Ethernet is shown; for example, the transmitted signal of the transmitter 110a forms an Echo in the receiver 120a, and the transmitted signals of the transmitters 110b, 110c and 110d form near-end cross talk (NEXT) in the receiver 120a.

For canceling the interference signals mentioned above, an interference canceling module, such as a filter, is utilized to process the received signal in the time domain. The filter generates an interference cancellation signal approximate to the interference signal respectively according to the transmitted signals of the transmitters 110a, 110b, 110c and 110d and the estimated channel impulse response. Then, the signal that should be received by the receiver 120a is found after the interference cancellation signal is subtracted from the received signal. However, the characteristics of the Echo and NEXT are not the same: the required taps of the filters utilized to simulate the Echo and NEXT are different. For example, under 10G Ethernet system, filters having about 250-500 taps and 800-1000 taps are required to simulate the NEXT and Echo respectively. The circuit complexity and the power consumption are both significant.

SUMMARY OF THE INVENTION

One objective of the present invention is therefore to provide an interference cancellation apparatus and a method thereof, to solve the above problems.

Another objective of the present invention is to provide an interference cancellation apparatus, which decreases the circuit complexity by dividing the received data into several groups and reducing the size of the transforming computation, and a method thereof.

Another objective of the present invention is to provide an interference cancellation apparatus, which divides the received data into several groups to reduce the size of the transforming computation, and thereby solve the length problem of the interference cancellation module, and a method thereof.

Another objective of the present invention is to provide an interference cancellation apparatus, which saves cost problem by sharing the transforming circuit, and a method thereof.

Yet another objective of the present invention is to provide an interference cancellation apparatus, which selects a better grouping length according to the channel variation and thereby improves the system performance, and a method thereof.

These and other objectives of the present invention will no doubt become obvious to those of ordinary skill in the art after reading the following detailed description of the preferred embodiment that is illustrated in the various figures and drawings.

DETAILED DESCRIPTION

The present invention performs the interference cancellation and channel equalization in the frequency domain. The Echo and NEXT, however, have different characteristics; therefore the length of the FFT circuit must accommodate its length to the length for simulating the Echo, causing waste to the NEXT simulation and power loss. Moreover, when high frequency components and low frequency components of the interference signal to be simulated are highly dissimilar, the bit number used to represent each frequency component should be different. Taking the Echo signal as an example, since the Echo signal has more high frequency components than low frequency components, if a bit number used to represent each frequency component of the Echo signal is the same, the selection of the bit number will be limited by the high frequency components. It is wasteful for the low frequency components to be represented by so many bits.

Figure 1:
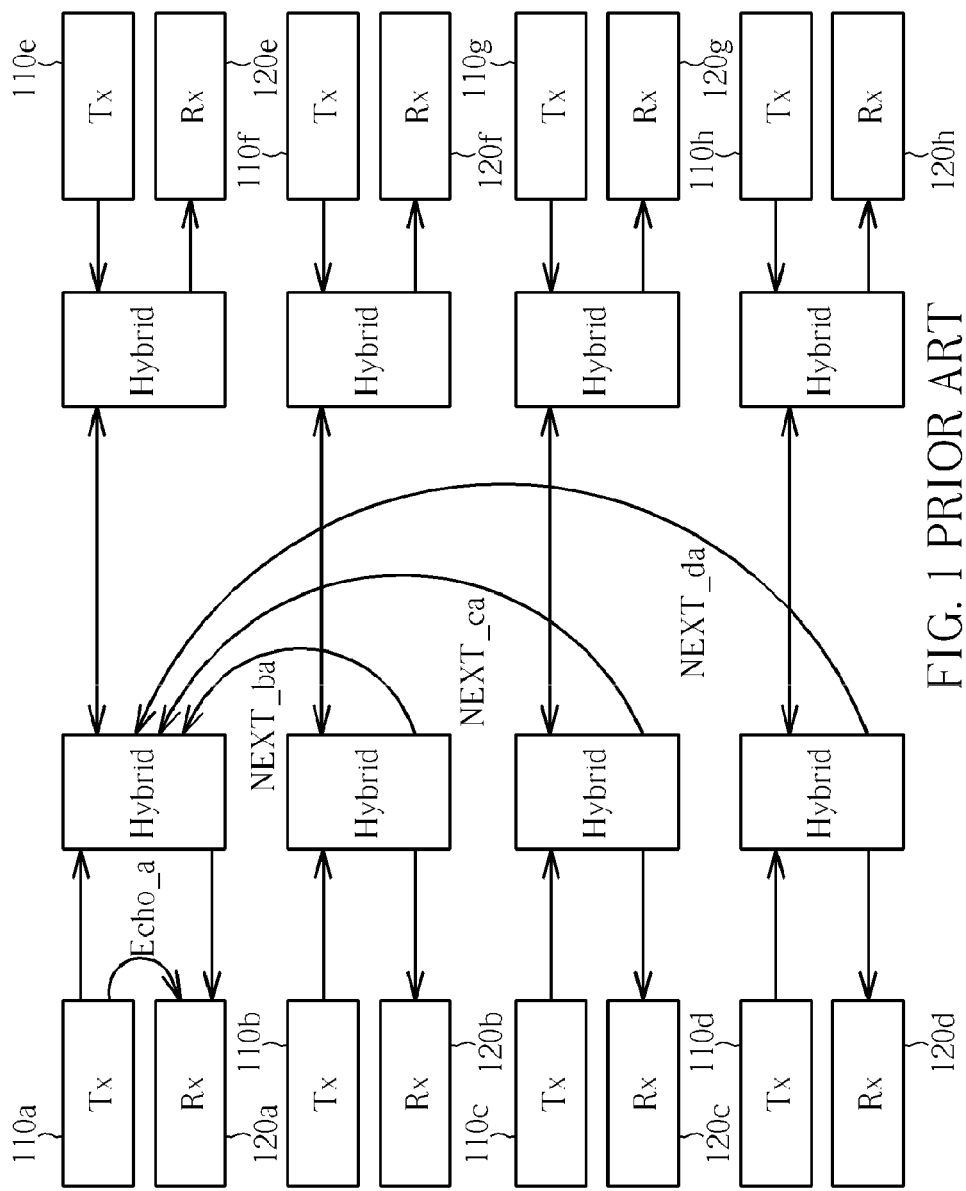
FIG. 1 is a diagram showing a full duplex communication accomplished by four unshielded twisted pairs.
Figure 2:
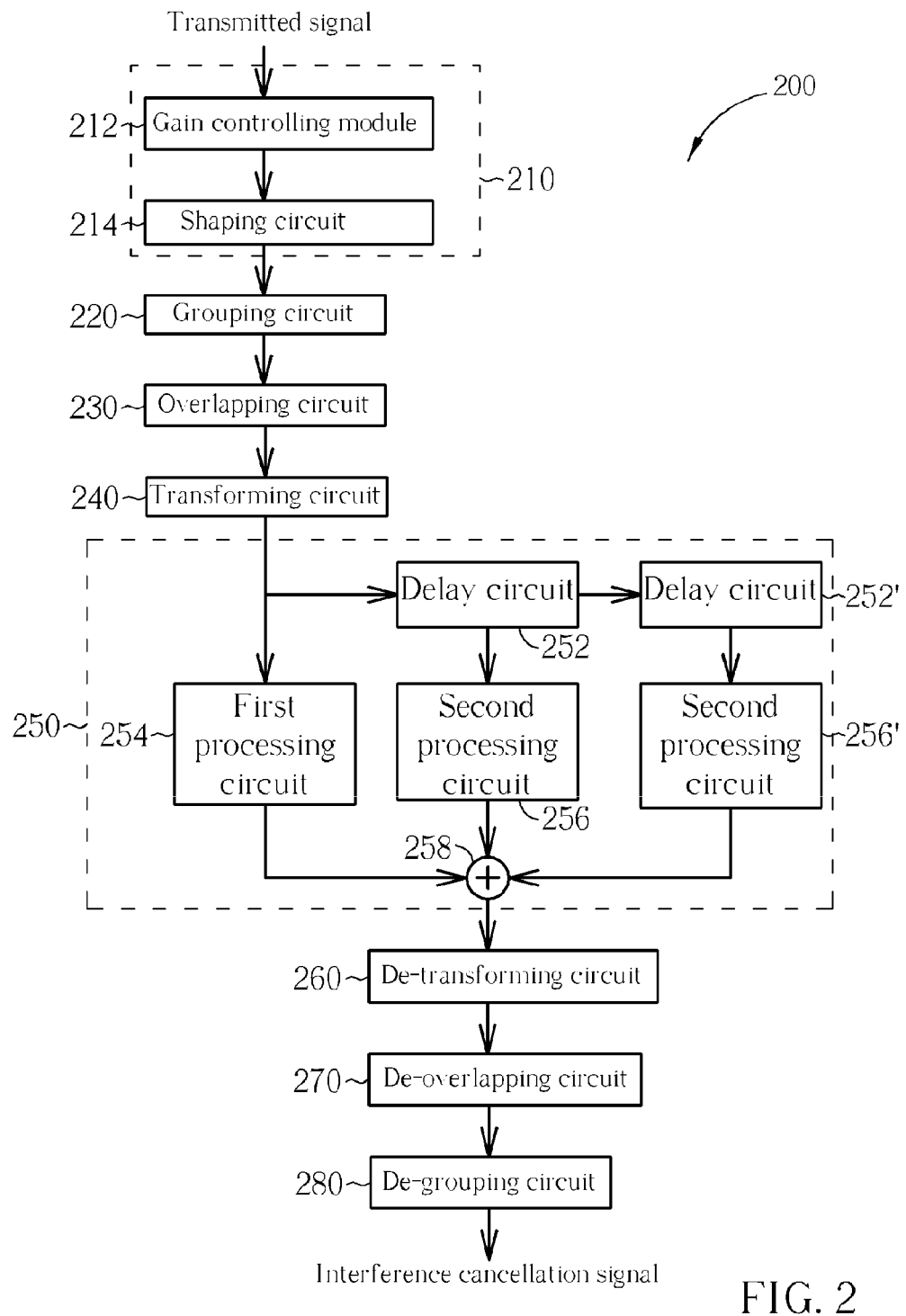
FIG. 2 shows a diagram of an interference cancellation apparatus according to an exemplary embodiment of the present invention.

FIG. 2 shows a diagram of an interference cancellation apparatus 200 considering only one twisted pair according to an exemplary embodiment of the present invention. The interference cancellation apparatus 200 simulates an interference cancellation signal corresponding to an interference signal (e.g. the above-mentioned Echo or NEXT) according to transmitted signals of transmitters, such as the transmitter 110a and/or the transmitter 110b in FIG. 1.

In order to simplify the computation complexity in the frequency domain, the interference cancellation apparatus 200 may comprise a time-domain processing module 210 to perform some simple processes on the transmitted signal, making the frequency distribution of the processed signal similar to the frequency distribution of the interference cancellation signal to be simulated. Please note that the time-domain processing module 210 can be omitted without affecting the achievement of goals of the present invention. In one embodiment, the time-domain processing module 210 comprises a gain controlling module 212 and a shaping circuit 214. The gain controlling module 212 is utilized to adjust the gain of the transmitted signal into a predefined region, and the shaping circuit 214 shapes the transmitted signal. Compared to the frequency distribution of the transmitted signal, the frequency distribution of the transmitted signal after the shaping process is more similar to that of the interference cancellation signal to be simulated.

In one embodiment, the shaping circuit 214 is a low-complexity feed-forward equalizer (FFE), which can be implemented by a finite-impulse-response (FIR) filter or an infinite-impulse-response (IIR) filter. The tap values of the filter can be roughly obtained from a conventional channel estimation algorithm, and are then fine-tuned according to an adaptive algorithm. The design goal of the shaping circuit 214 is to let the cancellation-signal generating module 250 have a uniform processing region, thereby a smaller bit number can be used to represent each frequency component. For example, because the Echo and NEXT signals both have more high frequency components than low frequency components, the shaping circuit 214 can be a high-pass filter, for simply adjusting the transmitted signal in the time domain to make the frequency distribution of the transmitted signal become similar to that of the Echo signal or the NEXT signal. In this way, the subsequent frequency-domain processing does not need to specifically amplify the high frequency component, and the bit number and the complexity can thereby be reduced.

The gain controlling module 212 controls the gain of the transmitted signal to fall within a predefined region. Therefore, only one set of the cancellation-signal generating module 250 is sufficient for varied interference cancellations or varied channel equalizations, allowing reductions in the cost and complexity for system development and maintenance. In implementation, the gain controlling module 212 can be a digital automatic gain controller (AGC) with length equal to 1 (the transmitted signal is digital). In addition, the gain controlling module 212 can be coupled behind the shaping circuit 214.

In the present embodiment, the transmitted signal is then delivered to a grouping circuit 220, such as a serial/parallel converter, to be divided into a plurality of groups of sub-data. An overlapping circuit 230 sequentially overlaps the output of the grouping circuit 220, and the overlapped sub-data is sequentially transformed from the time domain to the frequency domain by a transforming circuit 240. Since the data input to the transforming circuit 240 has been overlapped, the circular convolution performed by the transforming circuit 240 is equivalent to the linear convolution result in the time domain. The computation adopted by the transforming circuit 240 can be any computation that has time-domain/frequency-domain transforming functionality, e.g. Fast Fourier Transform (FFT), Sine Transform, Cosine Transform.

Each transformed sub-data is sequentially sent into the cancellation-signal generating module 250. The cancellation-signal generating module 250 comprises at least one delay circuit and a plurality of processing circuits, wherein the delay circuit is utilized to sequentially delay the transformed sub-data to generate a plurality of delayed sub-data. The processing circuits comprise a first processing circuit 254 and at least one second processing circuit 256. The first processing circuit 254 sequentially processes the plurality of transformed sub-data, while the second processing circuit 256 sequentially processes the plurality of delayed sub-data.

Please note that the numbers of the delay circuit 252 and the second processing circuit 256 correspond to the group number that the transmitted signal is divided into. The length of the transformation computation performed by the transforming circuit 240 and the length of the sub-data output by the grouping circuit 220 also correspond to the group number, while the group number corresponds to the characteristic of the interference cancellation signal, such as the length of the filter or tap number required for simulating the interference cancellation signal. For example, the predefined processing length for simulating the Echo signal is 900, and the predefined processing length for simulating the NEXT signal is 300. In order to decrease the size of the transforming circuit 240 (e.g. FFT) so as to lower the cost, the grouping circuit 220 divides the transmitted signal into three groups of sub-data, and the cancellation-signal generating module 250 utilizes two delay circuits 252 and 252' and three processing circuits (the first processing circuit 254 and the second processing circuits 256 and 256') to sequentially process the three groups of sub-data. Therefore, the first processing circuit 254 and the second processing circuits 256 and 256' are all processors having a length equal to 300 (900÷3). In other words, the size of the transforming circuit 240 is chosen according to the value 300. In another embodiment, the size of the transforming circuit 240 is 256 or 512, which is a value equal to $2^n$ and close to 300.

Both the first processing circuit 254 and the second processing circuits 256 and 256' in FIG. 2 respectively correspond to one part of the channel response between the transmitter 110a and the receiver 120a. In one embodiment, the first processing circuit 254 and the second processing circuits 256 and 256' all comprise a multiplier for multiplying the transformed sub-data by weighting coefficients. In one embodiment, the weighting coefficients corresponding to each processing circuits 254, 256 and 256' are derived from an adaptive algorithm (e.g. least square error algorithm, recursive least square (RLS), etc.) that estimates the channel response. After the three groups of transformed sub-data are respectively processed by the first processing circuit 254, the second processing circuit 256 and the second processing circuit 256', the output sum of these processing circuits 254, 256 and 256' (i.e. the output of the adder 258) is the interference cancellation signal in the frequency domain. Briefly speaking, the deliver flow of the sub-data inside the cancellation-signal generating module 250 is similar to the deliver flow inside a filter; the sub-data is multiplied by corresponding weighting coefficients by each processing circuit. Since the multiplication in the frequency domain is equivalent to the convolution in the time domain, the output of the adder 258 is therefore equivalent to the Echo signal obtained from convoluting the sub-data with the channel response.

The interference cancellation apparatus 200 can obtain the time-domain interference cancellation signal after inversely processing (in this embodiment, the inverse processes include de-transforming, de-overlapping and de-grouping) the frequency-domain interference cancellation signal. The de-transforming circuit 260, the de-overlapping circuit 270 and the de-grouping circuit 280 perform inverse processing corresponding to the transforming circuit 250, the overlapping circuit 230 and the grouping circuit 220, respectively. For example, when the transforming circuit 250 adopts FFT, the de-transforming circuit 260 then adopts IFFT. Since a skilled person can easily appreciate the functions and operations of the de-transforming circuit 260, the de-overlapping circuit 270 and the de-grouping circuit 280, the detailed description is omitted here for brevity.

The processing circuits update the weighting coefficients each time a group of sub-data is received. If the sub-data is too long (i.e. the size of the transforming computation is too long) so that the weighting coefficients are updated after quite a long time, the channel variation cannot be reflected instantaneously, and the interference cancellation performance is therefore degraded. Therefore, the size of the transforming computation can be designed according to the varying degree of the channel characteristic. When the channel is detected as a fast-varying channel, a small transforming computation size should be chosen; otherwise, a large transforming computation size should be chosen to achieve a better system performance.

Figure 3:
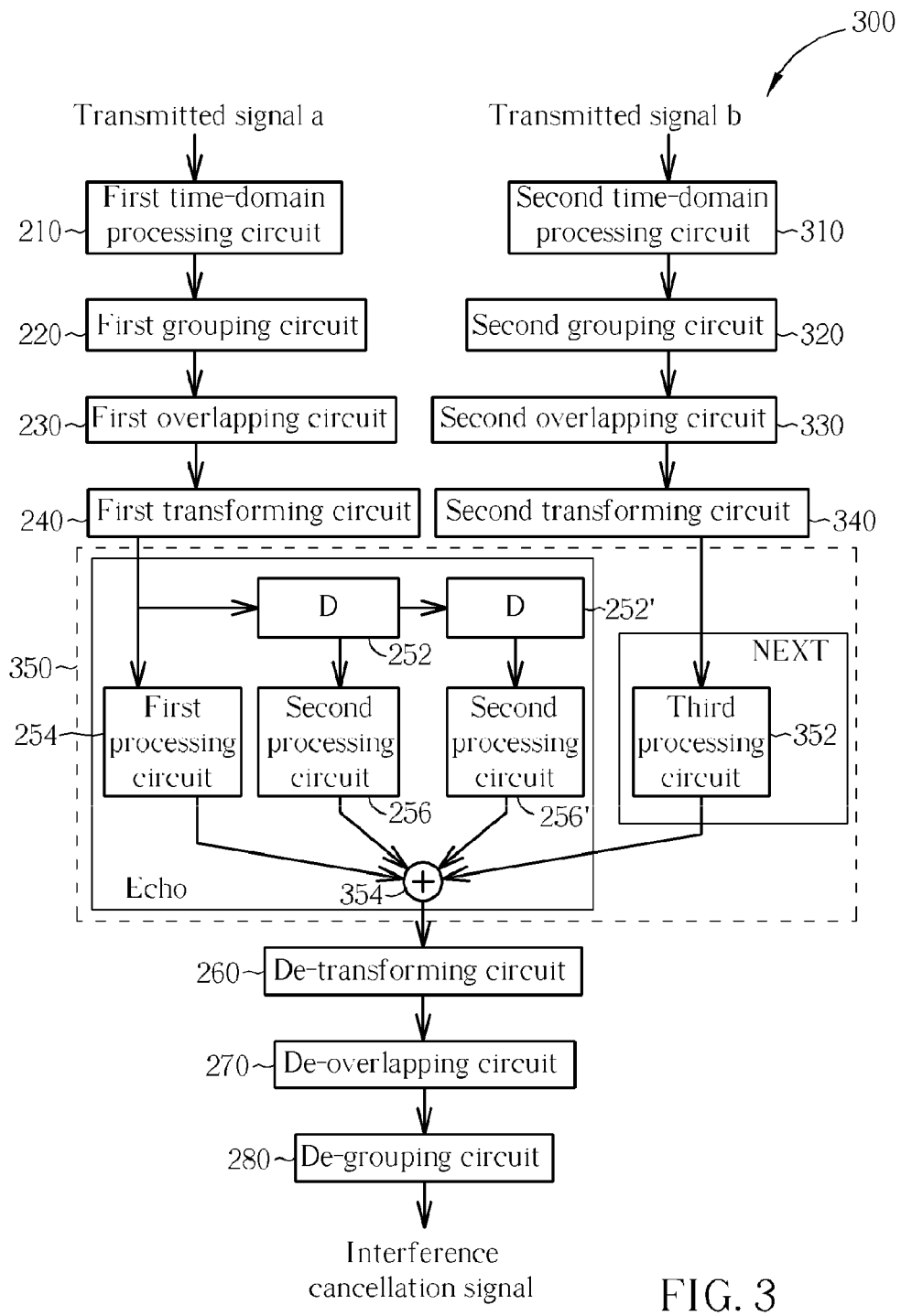
FIG. 3 shows a diagram of an interference cancellation apparatus according to another exemplary embodiment of the present invention.

When considering one twisted pair, there are other interference signals, such as interference due to other twisted pairs. Please refer to FIG. 3, which is a diagram of an interference cancellation apparatus 300 for canceling a plurality of interference signals according to one exemplary embodiment of the present invention. The interference cancellation signal generated by the interference cancellation apparatus 300 is utilized to cancel the Echo_a signal produced by the transmitter 110a and the NEXT_ba signal produced by the transmitter 110b. The transmitted signal a is the transmitted signal of the transmitter 110a, and the transmitted signal b is the transmitted signal of the transmitter 110b. Compared to the interference cancellation apparatus 200, the interference cancellation apparatus 300 further comprises a second time-domain processing module 310, a second grouping circuit 320, a second overlapping circuit 330 and a second transforming circuit 340. Therefore, the transmitted signal b is divided into several groups of second sub-data, and the groups of second sub-data are sequentially transformed to the frequency domain to generate several groups of transformed second sub-data. The cancellation-signal generating module 350 shown in FIG. 3 further comprises a third processing circuit 352, for sequentially multiplying the groups of transformed second sub-data by the weighting coefficients corresponding to the channel response between the transmitter 110b and the receiver 120a, to generate the frequency-domain NEXT_ba signal.

In one embodiment, the size of the transforming computation performed by the second transforming circuit 340 is equal to that performed by the first transforming circuit 240. In one embodiment, the size is decided according to the shorter predefined processing length between the Echo_a signal and the NEXT_ba signal. For example, because the predefined processing length of the Echo_a signal is 900 and the predefined processing length of the NEXT_ba signal is 300, the transformation size is decided according to the value of 300 or is a power of 2 that is close to 300 (e.g. 256 or 512). In this condition, three (900÷300) processing circuits (the first processing circuit 254 and the second processing circuits 256 and 256') are utilized to simulate the Echo_a signal, while one processing circuit (the third processing circuit 352) is utilized to simulate the NEXT_ba signal. Compared to the conventional techniques, the present invention can solve the problem where the transforming computation will be wasted, which results from the different signal length of different interference signals, without performance loss. Likewise, the weighting coefficients of the third processing circuit 352 can be derived by an adaptive algorithm that estimates the channel response between the transmitter 110b and the receiver 120a. The length of the transforming computation can also be modified according to the channel variation characteristic in order to optimize the system performance. Since a skilled person can readily appreciate the modified designs after reading the above disclosure, the detailed description is omitted here for brevity.

Figure 4:
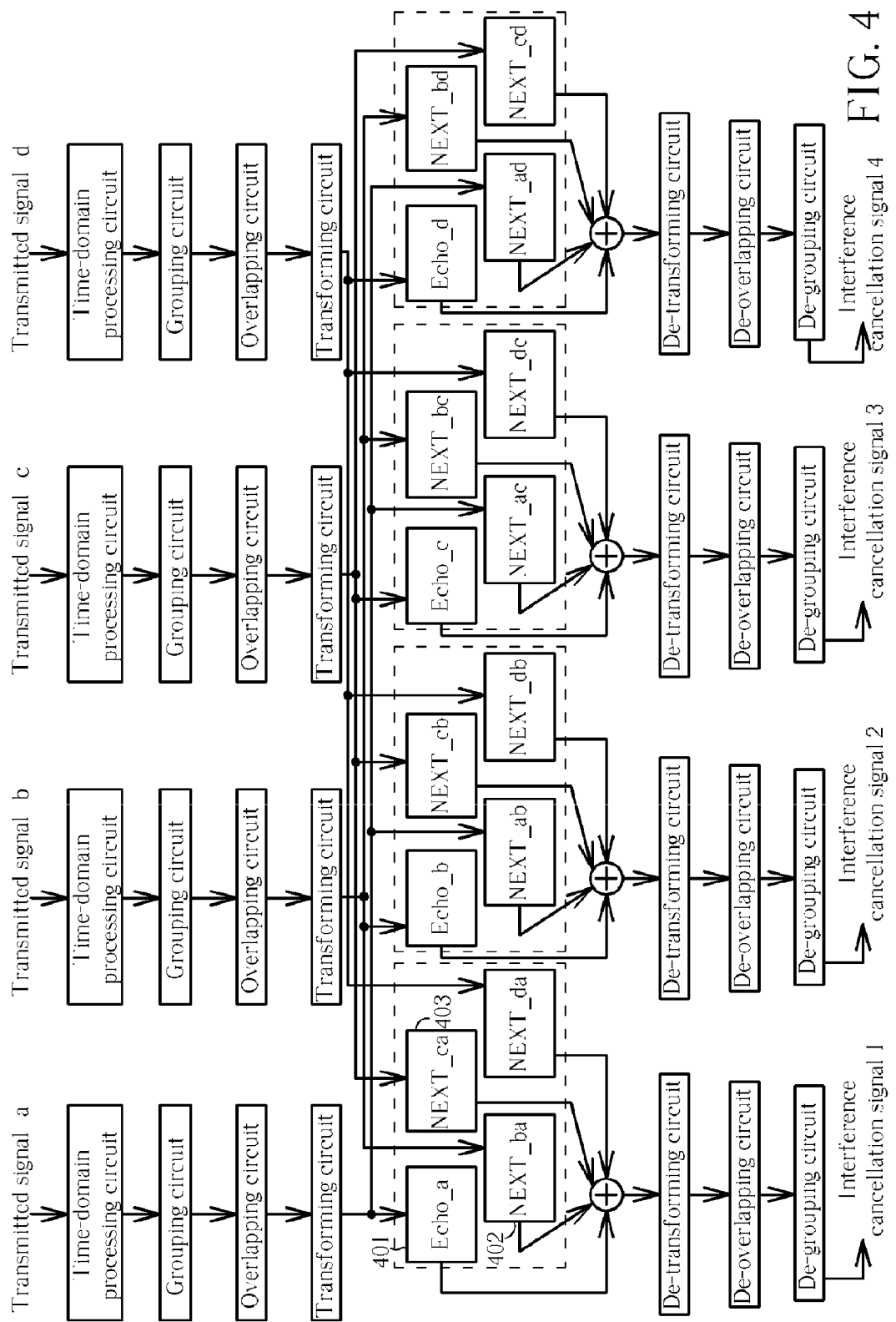
FIG. 4 shows a diagram of an interference cancellation apparatus according to another exemplary embodiment of the present invention.

When the above-mentioned interference cancellation apparatus is implemented in a communication system with four twisted pairs (such as the configuration shown in FIG. 1), the configuration is as shown in FIG. 4. The Echo-processing modules, e.g. the Echo_a processing module 401, the Echo_b processing module, the Echo_c processing module and the Echo_d processing module, have similar structures to the Echo-processing module in FIG. 3. The NEXT-processing modules in FIG. 4, e.g. the NEXT_ba processing module, the NEXT_ca processing module, the NEXT_da processing module, the NEXT_db processing module and the NEXT_cd processing module, are utilized to simulate the NEXT signals, and have similar structures to the NEXT-processing module in FIG. 3. Since a skilled person can readily appreciate this modified design after reading the above disclosure, the detailed description is omitted here for brevity.

Those skilled in the art will readily observe that numerous modifications and alterations of the device and method may be made while retaining the teachings of the invention.

What is claimed is:

1. An interference cancellation apparatus, comprising:
   a first interference-cancellation module, comprising:
      a first processing circuit, comprising:
         a grouping circuit, for dividing received data into a plurality of groups of first sub-data;
         a first transforming circuit, coupled to the first processing circuit, for sequentially transforming the groups of first sub-data from a first domain to a second domain to generate a plurality of groups of first transformed sub-data; and
      a first cancellation-signal generating circuit, coupled to the first transforming circuit, the first cancellation-signal generating circuit comprising:
         a delay unit, for sequentially delaying the groups of first transformed sub-data to generate a plurality of groups of delayed sub-data; and
         a first processing unit and a second processing unit, the first processing unit outputting a first processed signal according to the groups of first transformed sub-data, and the second processing unit outputting a second processed signal according to the groups of delayed sub-data;
   wherein the first cancellation-signal generating circuit outputs a first cancellation signal according to the first processed signal and the second processed signal, while the first cancellation signal corresponds to an estimation value of a first interference signal on a first twisted pair.

2. The apparatus of claim 1, wherein the first cancellation-signal generating circuit further comprises:
   a third processing unit, for receiving a plurality of groups of second transformed sub-data, and outputting a second cancellation signal according to the groups of second transformed sub-data, wherein the second cancellation signal corresponds to an estimation of a second interference signal on the first twisted pair; and
   a summing circuit, for receiving the first and second cancellation signals to generate a first interference-cancellation signal.

3. The apparatus of claims 1, wherein the first processing circuit further comprises an overlap circuit, coupled between the grouping circuit and the first transforming circuit, for overlapping the groups of first sub-data; and the apparatus further comprises a de-overlap circuit, for performing an inverse computation of the overlap circuit.

4. The apparatus of claims 1, further comprising:
   a de-grouping circuit, coupled to the first cancellation-signal generating circuit, for performing an inverse computation of the grouping circuit.

5. The apparatus of claim 1 or 2, further comprising:
   a first de-transforming circuit, coupled to the first cancellation-signal generating circuit, for transforming an output of the first cancellation-signal generating circuit from the second domain to the first domain.

6. The apparatus of claims 1, wherein a size of the transforming computation of the first transforming circuit corresponds to characteristics of the first interference signal.

7. The apparatus of claims 1, further comprising:
   a second interference-cancellation module, for outputting an estimation signal corresponding to an interference signal on a second twisted pair.

8. The apparatus of claim 7, further comprising:
   a third interference-cancellation module, for outputting an estimation signal corresponding to an interference signal on a third twisted pair; and
   a fourth interference-cancellation module, for outputting an estimation signal corresponding to an interference signal on a fourth twisted pair.

9. The apparatus of claim 1, wherein a size of the transforming computation of the first transforming circuit is less than a longest predefined processing length of the first interference signal in the second domain.

10. The apparatus of claim 1, further comprising:
a time-domain processing module, for performing at least one of a gaining processing and a shaping processing on the received data, and then outputting the processed received data to the first interference-cancellation module.

11. An interference canceling method, comprising:
dividing a received first data into a plurality of groups of first sub-data;
transforming the groups of first sub-data from a first domain to a second domain to generate a plurality of groups of first transformed sub-data;
delaying the groups of first transformed sub-data to generate a plurality of groups of first delayed sub-data;
processing the groups of first transformed sub-data and the groups of first delayed sub-data respectively to generate a plurality of processed signals;
summing up the processed signals to generate a first cancellation signal, wherein the first cancellation signal corresponds to an estimation value of a first interference signal on a first twisted pair;
dividing a received second data into a plurality of groups of second sub-data;
transforming the groups of second sub-data from the first domain to the second domain to generate a plurality of groups of second transformed sub-data; and
processing the groups of second sub-data to generate a second cancellation signal, wherein the second cancellation signal corresponds to an estimation value of a second interference signal on the first twisted pair.

12. The method of claim 11, wherein the step of dividing the first data further comprises:
overlapping the groups of first sub-data.

13. The method of claim 11, further comprising:
summing a plurality of cancellation signals to generate a first interference-cancellation signal, wherein the plurality of cancellation signals comprises the first cancellation signal and the second cancellation signal.

14. The method of claim 13, further comprising:
transforming the first interference-cancellation signal from the second domain to the first domain;
de-overlapping the first interference-cancellation signal; and
de-grouping the first interference-cancellation signal.

15. The method of claim 11, wherein a size of the transforming computation between the first domain and the second domain corresponds to characteristics of the first cancellation signal.

16. The method of claim 11, wherein a size of the transforming computation between the first domain and the second domain is less than a longest predefined processing length of the first interference signal in the second domain.

17. The method of claim 11, wherein a size of the transforming computation between the first domain and the second domain is equal to $2^N$, wherein N is an integer.

18. An interference cancellation apparatus, for generating an interference estimation signal according to an input signal, the apparatus comprising:
a first-domain processing module, comprising a grouping circuit, for receiving the input signal, and dividing the input signal into a plurality of groups to generate a processed signal;
a transforming module, coupled to the first-domain processing module, for transforming the processed signal from a first domain to a second domain to generate a transformed signal; and
a second-domain processing module, coupled to the transforming module, for generating the interference estimation signal according to the transformed signal, wherein the interference estimation signal corresponds to an estimation value of an interference signal on a transmission line;
wherein a size of the transforming computation of the transforming module is less than a longest predefined processing length of the first interference signal in the second domain.

19. The apparatus of claim 18, wherein the first-domain processing module further comprises at least one of a gain controlling module and a shaping circuit, for adjusting a gain of the input signal or shaping the input signal respectively.

20. The apparatus of claim 18, wherein the processed signal comprises a plurality of groups of transformed sub-data.

21. The apparatus of claims 20, wherein the first-domain processing module further comprises:
an overlapping circuit, for receiving and overlapping the plurality of groups of first sub-data.

22. The apparatus of claim 18, implemented in an Ethernet system.

23. The apparatus of claim 22, implemented in a 10GBase-T system or a 1000Base-T system.

24. The apparatus of claim 18, wherein after the input signal is shaped, frequency distribution of the input signal becomes nearer to frequency distribution of the interference estimation signal.

25. An interference cancellation method, for generating an interference estimation signal according to an input signal, the method comprising:
in a first domain, dividing the input signal into a plurality of groups of sub-data;
transforming the plurality of groups of sub-data from the first domain to a second domain to generate a plurality of groups of transformed sub-data; and
in the second domain, performing a second-domain process on the plurality of groups of transformed sub-data to generate the interference estimation signal corresponding to an estimation value of an interference signal on a transmission line;
wherein a size of the transforming computation between the first domain and the second domain is less than a longest predefined processing length of the interference signal in the second domain.

26. The method of claim 25, wherein the step in the first domain further comprises:
overlapping the groups of sub-data.

27. The method of claim 25, wherein the step in the first domain further comprises:
at least adjusting a gain of the input signal or shaping the input signal the groups of sub-data.

28. The method of claim 27, wherein after the input signal is shaped, frequency distribution of the input signal becomes nearer to frequency distribution of the interference estimation signal.

29. An interference cancellation apparatus, comprising:
a first-domain processing module, comprising a grouping circuit, for receiving an input signal, and dividing the input signal into a plurality of groups to generate a processed signal;

a transforming module, coupled to the first-domain processing module, for transforming the processed signal from a first domain to a second domain to generate a transformed signal; and a second-domain processing module, coupled to the transforming module, for generating an interference estimation signal according to the transformed signal, wherein the interference estimation signal corresponds to an estimation value of an interference signal on a transmission line;

wherein a size of the transforming computation between the first domain and the second domain is equal to $2^N$, wherein N is an integer.

30. An interference cancellation method, for generating an interference estimation signal according to an input signal, the method comprising:

in a first domain, dividing the input signal into a plurality of groups of sub-data;

transforming the plurality of groups of sub-data from the first domain to a second domain to generate a plurality of groups of transformed sub-data; and in the second domain, performing a second-domain process on the plurality of groups of transformed sub-data to generate the interference estimation signal corresponds to an estimation value of an interference signal on a transmission line;

wherein a size of the transforming computation between the first domain and the second domain is equal to $2^N$, wherein N is an integer.

* * * * *